UNITED STATES PATENT OFFICE 1,988,176

POLYGLYCOL ARSENITE AND METHOD FOR PRODUCING SAME

David R. Merrill, Long Beach, Calif., assignor to Union Oil Company of California, Los Angeles, Calif., a corporation of California No Drawing. Application February 23, 1932, Serial No. 594,733

25 Claims. (Cl. 260—14)

The present invention relates to a process of producing arsenical preparation, and in particular, arsenical preparations suitable for use as insecticides and wood preservatives. The invention further relates to the manufacture of the esters of amphoteric metals, such as arsenic, antimony and tin, of which arsenic esters possess the greatest toxic properties and are most suitable as insecticides and wood preservatives to exterminate termite infestation in wood structures and to prevent rot and fungus growth.

It is an object of the present invention to produce esters of the acids of amphoteric metals by heating the acid and alcohol in the presence of an esterification catalyst.

It is a further object of this invention to produce arsenite esters by the interaction of an alcohol and arsenious acid or arsenious oxide in the presence of an esterification catalyst.

It is another object of this invention to produce arsenite esters from the saturated monohydric alcohol, such as ethyl, propyl, butyl, etc., alcohols, by the interaction of the respective monohydric alcohol and arsenious acid or oxide in the presence of an esterification catalyst, such as hydrochloric acid.

It is a further object of this invention to produce arsenic esters of aliphatic mono and dihydric alcohols by heating arsenious acid or oxide with an alcohol chosen from a group of alcohols having the general formula ROH where R is either a simple alkyl radical or the radical of ethylene glycol mono-alkyl ether or di-ethylene glycol mono-alkyl ether; that is, an alcohol containing an ether linkage and in the presence of an esterification catalyst.

It is another object of this invention to produce arsenite esters from ethers of ethylene glycol by heating a mixture of the alcohol and arsenious acid or oxide in the presence of hydrochloric acid.

It is another object of this invention to produce arsenite esters from the mono-ethers of ethylene glycol by heating a mixture of the alcohol-ether and arsenious acid or oxide in the presence of hydrochloric acid.

It is a further object of this invention to produce arsenite esters from the ethers of di-ethylene glycol by heating a mixture of the alcohol and arsenious acid or oxide and separating the water of reaction by distillation. It is also an object of this invention to produce these arsenite esters either without the use of an esterification catalyst or with a catalyst.

It is a further object of this invention to produce arsenite esters from the mono-ethers of di-ethylene glycol by heating a mixture of the alcohol-ether and arsenious acid or oxide and separating the water of reaction by distillation. It is also an object of this invention to produce these arsenite esters either without the use of an esterification catalyst or with a catalyst.

I have discovered that commercial quantities of arsenite esters may be satisfactorily and rapidly produced if the reaction between the inorganic acids, such as arsenious acids, and the alcohol takes place in the presence of small quantities of an esterification catalyst, such as hydrochloric acid.

The production of the arsenite esters by the process of the present invention may perhaps be best illustrated by a series of examples. However, it is to be understood that these examples are not intended to limit my invention in any manner, since many variations may be made by those skilled in the art.

The first group of arsenite esters to be described are those derived from the saturated monohydric alcohols, such as ethyl, propyl, butyl, etc., alcohols, among which only the production of arsenite esters of ethyl, amyl and octyl alcohols will be illustrated by examples. In the case of the monohydroxy alcohols having boiling points above that of water, the reaction went to completion readily by merely evaporating from the mixtures the water present in the reactance and that formed by the reaction. In the case of alcohols having boiling points below that of water, some difficulty was encountered due to the distillation of the alcohol with the water during heating of the mixture. However, esters containing theoretical amounts of arsenite trioxide may be obtained by the process to be described.

In order to form ethyl arsenite, I have proceeded as follows:

Four mols, i. e. 184 grams of absolute ethyl alcohol and one mol (198 grams) of arsenious oxide, were placed in a still and the mixture was saturated with dry hydrogen chloride. The mixture was then heated until distillation occurred. Additional absolute alcohol was then added to the still at a rate equal to the distillation rate. In this manner, the water formed by the reaction between the ethyl alcohol and arsenious acid was removed as a constant-boiling mixture of alcohol and water. The product produced was di-ethyl arsenite. It will be observed that this reaction proceeded without a dehydrating agent in the reaction mixture.

In the preparation of amyl arsenite, four mols (353 grams) of amyl alcohol, one mol (198 grams)

of arsenious oxide and sufficient 31% hydrochloric acid to provide three mols (54 grams) of water were heated together in a still. During the operation, the distillate recovered consisted of two phases, i. e. an aqueous phase containing hydrochloric acid and an alcohol phase. As the distillation progressed, the alcohol removed during the distillation was returned to the still. When no more water was observed in the distillate and all of the solid arsenious oxide had disappeared from the still, the reaction was considered complete. Di-amyl arsenite was thus produced containing the theoretical percentage of approximately 37% of arsenious oxide.

The procedure employed in the manufacture of amyl arsenite was followed in a case of producing octyl arsenite. In this case, dioctyl arsenite was produced containing the theoretical percentage of approximately 29% of arsenious oxide.

The theoretical percentages of arsenious oxide in the ester will vary with the molecular weight of the alcohol from which the arsenite ester is produced. In general, the lower the molecular weight of the alcohol employed, the higher will be the arsenic content of the ester.

When monohydroxy alcohols like ethyl, butyl, amyl, capryl, etc. alcohols are heated in the presence of an excess of arsenious oxide there is very little, if any, formation of the arsenites of the corresponding alcohols. If, however, a small amount of hydrochloric acid is present in the mixture the tendency is to form products of arsenic content corresponding to di-alkyl arsenites, particularly with the higher alcohols such as amyl and capryl alcohols.

The reaction of these alcohols with arsenious acid does not proceed to produce the di-esters as in the case of the aforesaid alcohols, i. e. the saturated aliphatic monohydric alcohols such as ethyl alcohol and the ethers of ethylene glycol such as beta ethoxy ethanol. I have discovered there is a greater tendency to form the mono-arsenites from the mono-ethers of di-ethylene glycols.

I have also discovered that the equilibrium in the uncatalyzed esterification reaction between arsenious oxide and alcohols shifts more in the direction of producing greater yields of esters as we proceed from the simple aliphatic straight chain alcohols and the glycols or their ethers to the poly glycols such as di-ethylene glycol or its ethers. Thus, in the case of the monohydric aliphatic alcohols and the ethylene glycols and their ethers, the uncatalyzed esterification reaction does not yield any appreciable amount of esters, while in the case of the di-ethylene glycols and their ethers, the reaction yields an appreciable amount of arsenite esters. The use of a catalyst, however, in the case of all the above alcohols shifts the equilibrium to form greater amounts of the ester. In the case of the ethers of di-ethylene glycol, the catalyzed esterification reaction is quantitative to produce theoretical yields of the ester.

For the sake of definition, the monohydric aliphatic alcohols such as ethyl, amyl or octyl alcohols and the polyhydric alcohols such as ethylene glycol or its ethers such as beta ethoxy ethanol will be termed the simple alcohols whereas the polyglycols such as di-ethylene glycol or its ethers such as beta hydroxy ethyl beta' ethoxy ethyl ether will be termed polyglycols.

The generic distinction between the simple alcohols having a free (OH) group and the polyglycols and their ether derivatives having a free (OH) group lies in the fact that whereas the first group member in my reactions cannot be esterified with acids of amphoteric metals such as arsenious acid or its oxide unless a catalyst is present, the members of the last mentioned group react with arsenious acid or oxide without a catalyst. Additionally, whereas the simple alcohols tend to form the di-esters of arsenious acid which I believe to be pyro-arsenious acid, the polyglycols tend to form the mono-esters of arsenious acid which I believe to be meta-arsenious acid.

It is to be observed that the formula given in this specification and the discussion of the course of the reaction are merely to illustrate and explain my understanding of this invention and are not to be taken as limiting. The constitution and formula of the esters herein are derived from an analysis of the arsenic contents of the esters after more or less complete purification.

In the following disclosure of my invention, the terms "cellosolve" and "carbitol" are employed to indicate such higher alcohols as beta ethoxy ethanol (ethyl ether of ethylene glycol) and beta hydroxy ethyl beta' ethoxy ethyl ether (mono-ethyl ether of di-ethylene glycol), respectively. The exact chemical formulæ of these compounds have been charted by Alexander Lowy in the "News Edition" of the "Industrial and Engineering Chemistry", Vol. 10, No. 1, page 6.

To produce the arsenites of the higher alcohols, such as the mono-ethers of ethylene glycol and in particular beta methoxy ethanol i. e., methyl "cellosolve", beta ethoxy ethanol i. e., "cellosolve" and beta butoxy ethanol i. e., butyl "cellosolve", approximately four mols of any of the above alcohols are heated with one mol of arsenious oxide and sufficient concentrated hydrochloric acid to provide three mols of water. The mixture is heated in a distillation apparatus until all of the water in the original mixture and all of the water formed during the reaction is removed by distillation. The reaction was completed after several hours heating and it was found that the arsenious oxide had reacted with the alcohol to form the respective arsenite esters. Upon examination of the esters thus produced, it was found that the amount of arsenious oxide in the esters approached the theoretical percentages. Thus, when using methyl "cellosolve" as the alcohol, dimethyl "cellosolve" arsenite was produced containing approximately the theoretical amount of arsenious oxide, i. e. 42.5%. When using "cellosolve" as the alcohol, di "cellosolve" arsenite was produced containing approximately the theoretical amount of arsenious oxide, i. e. 38%, and when employing butyl "cellosolve", di-butyl "cellosolve" arsenite was formed containing approximately the theoretical percentage of arsenious oxide, i. e. 31.2%. Of course, the theoretical percentages of the arsenious oxide in the ester will vary with the molecular weight of the alcohol from which the arsenite ester is produced.

When the mono-ethers of ethylene glycol are heated in the presence of an excess of arsenious oxide uncatalyzed by acid, except in the case of methyl "cellosolve", no appreciable formation of arsenites has been detected. In the case of methyl "cellosolve" an incomplete reaction to form presumably the dimethyl "cellosolve" arsenite occurs.

I have not been able to produce alcohol-arsenic or "cellosolve"-arsenic compounds containing more arsenic than the di-alkyl arsenites either by prolonged heating in the presence of an excess of arsenious oxide or by redistillation under vacuum. I may generalize, therefore, on the arsenites of the monohydroxy alcohols and of the mono-ethers of ethylene glycol as follows:

First, that the maximum arsenic content of the arsenites formed during my work corresponds approximately with those of the respective di-alkyl arsenites.

Second, that very little, if any, formation of the arsenic derivatives is realized by simply heating the alcohol and arsenious oxide together, and that it is necessary to use hydrochloric acid as a catalyst to obtain the compound of highest arsenic content.

It will be observed that the above arsenites, i. e. those derived from the aliphatic alcohols and the mono-substituted glycols, were not formed to any appreciable extent when the hydrochloric acid was omitted from the mixture.

The above examples have been submitted to illustrate the procedure for producing certain arsenite esters which require the use of an esterification catalyst, such as hydrochloric acid for their formation. These are all presumably the di-esters of pyroarsenious acid having, in general, the formula $As_2O(OR)_4$ where R is the organic radical of the alcohol forming the ester. However, in the course of my investigation, I have discovered that several of the higher alcohols do not require the use of an esterification catalyst in order to produce the arsenite esters containing appreciable quantities of arsenious oxide. These alcohols are di-ethylene glycol and its derivatives such as the mono-ethers and in particular beta hydroxy ethyl beta methoxy ethyl ether i. e., methyl "carbitol", beta hydroxy ethyl beta' ethoxy ethyl ether i. e., "carbitol" and beta hydroxy ethyl beta' butoxy ethyl ether i. e., butyl "carbitol".

To produce methyl "carbitol" arsenite, four mols (481 grams) of methyl "carbitol" and one mol (198 grams) of arsenious oxide were added to a still and were heated to approximately 300° F. During the heating period, a small amount of water was removed by distillation. However, all of the arsenious oxide was not used during the reaction. The resulting product was impure dimethyl "carbitol" arsenite. It contained approximately 20% of arsenious oxide instead of the theoretical amount of approximately 31% of arsenious oxide. It is probably a mixture containing approximately 66% of dimethyl "carbitol" arsenite. When a small amount of hydrochloric acid was added to the four mols of methyl "carbitol" and one mol of arsenious oxide, the reaction proceeded to completion to give dimethyl "carbitol" arsenite containing approximately the theoretical percentage of 31% of arsenious oxide.

To produce the arsenite ester of "carbitol", four mols (536.5 grams) of "carbitol" and one mol (198 grams) of arsenious oxide were heated together in a still until one mol (18 grams) of water was removed by distillation. The water removed by distillation was formed during the reaction between "carbitol" and the arsenious oxide. When all of the water was distilled, all of the arsenious oxide had disappeared from the still. This occurred at a temperature of approximately 280° F. It is preferable to add a small amount of water to the still prior to the heating operation since this reduces the vigor with which the reaction occurs and makes the operation smoother than where no water is added. The product formed in this case was presumably the di "carbitol" arsenite which contains approximately 28% $As_2O_3$. When the di "carbitol" arsenite produced by the aforesaid heating was distilled, it was observed that the material first obtained was "carbitol". As a second product of the distillation, a mono "carbitol" arsenite was obtained at a temperature of above 540° F. The theoretical arsenious oxide content mono "carbitol" arsenite is approximately 44%.

The arsenious oxide content of the various di "carbitol" arsenites produced during the operations similar to that described above, i. e. without the use of a catalyst, ranges from approximately 25% to 32% and the arsenious oxide content of the mono "carbitol" arsenites produced by the distillation of mono "carbitol" arsenite containing the free "carbitol" was approximately 40%. It is thus apparent that the arsenic contents of the arsenite esters produced as above compared favorably with the theoretical amounts.

However, when a small amount of an esterification catalyst, such as hydrochloric acid, is added to the mixture of "carbitol" or other mono-ethers of di-ethylene glycol and arsenious oxide, the tendency is for the arsenic to react with the "carbitol" when the mixture is heated to form the mono-alkyl and di-alkyl arsenites. In the case of "carbitol", mono "carbitol" arsenite is produced which contains the theoretical amount of approximately 44% of arsenious oxide rather than a mixture of mono "carbitol" arsenite and free "carbitol". In the case of methyl "carbitol", a compound containing approximately the same arsenious oxide content as dimethyl "carbitol" arsenite is produced.

The same procedure was followed when producing butyl "carbitol" arsenite. Without the use of an esterification catalyst, a mixture of monobutyl "carbitol" arsenite and free butyl "carbitol" was obtained. When hydrochloric acid was added to the butyl "carbitol" and arsenious acid, monobutyl "carbitol" arsenite was obtained containing approximately the theoretical percentage of arsenious oxide, i. e. 39.2%.

When the mono-ethers of di-ethylene glycol are heated with an excess of arsenious oxide, compounds are formed in the cases of methyl "carbitol" and "carbitol" which have arsenic contents approximating those of the corresponding tri-alkyl and di-alkyl arsenites, respectively. No appreciable amount of an arsenic derivative is obtained when butyl "carbitol" and arsenious oxide are heated together under similar conditions. When hydrochloric acid is added to the mixture of the monomethyl or mono-ethyl ether of di-ethylene glycol and arsenious oxide and the resulting mixture heated until all of the water present in the ingredients and formed during the reaction is removed by distillation, compounds are formed which contain considerably more arsenic than those formed without hydrochloric acid. The arsenite of methyl "carbitol" formed without a catalyst contains less arsenic than trimethyl "carbitol" arsenite. The arsenite formed with hydrochloric acid has an arsenic content corresponding approximately to the dimethyl "carbitol" arsenite. In the case of "carbitol", the arsenite formed without hydrochloric acid contains approximately the proper arsenic content for the di "carbitol" arsenite and that formed with hydrochloric acid contains slightly less arsenic than that required for the mono "carbitol" arsenite. A fraction was obtained from the so-called di "carbitol" arsenite by distillation under vacuum which had an arsenic content approaching that of the mono "carbitol" arsenite. Therefore, there appear to be two methods of producing materials corresponding in arsenic content to mono "carbitol" arsenite: First, by heating "carbitol" in the presence of an excess of arsenious oxide and hydrochloric acid until all of the water present in the original ingredients and formed during the reaction is removed by distillation. Second, by distilling under vacuum a "carbitol" arsenite of relatively low arsenic content to obtain a fraction either as an overhead cut or as a residue containing approximately the same amount of arsenic as the mono "carbitol" arsenite. A marked similarity has been found between the behavior of "carbitol" and butyl "carbitol", and, therefore, the comments made above for "carbitol" apply equally well to butyl "carbitol".

With respect to the arsenites formed from the mono-ethers of di-ethylene glycol, it would appear that the use of hydrochloric acid as a catalyst results in the production of compounds of highest arsenic content. We would conclude that there is a greater tendency to form the mono-alkyl arsenites from the mono-ethers of di-ethylene glycol than from any of the other alcohols or mono-ethers of ethylene glycol considered, and that the higher molecular weight "carbitols" show the greatest tendency to form the mono-alkyl arsenites.

I believe the best method of summarizing the entire situation would be to state that compounds of highest arsenic content are obtained in the cases where arsenious oxide is present in excess and when hydrochloric acid is used as a catalyst. While I believe that the formulæ given for the products of the above reactions are probably correct, I do not wish to be bound by this theory of the course of the reaction. What I am most interested in is in the formation of arsenic derivatives containing relatively large amounts of arsenic, which are soluble in petroleum distillates or whose solution in petroleum distillate can be promoted by the use of suitable blending agents. In view of my work, I believe that in the cases where the arsenic derivatives are formed from mono-ethers of ethylene glycol and di-ethylene glycol as in the cases of methyl "cellosolve" and methyl "carbitol", without the use of hydrochloric acid as a catalyst, the reaction is primarily an incomplete conversion of the alcohol into the di-alkyl and mono-alkyl arsenites, i. e., dimethyl "cellosolve" arsenite and mono-methyl "carbitol" arsenite, respectively; and that the use of hydrochloric acid as a catalyst increases the yield of these compounds in each case.

These arsenites may be purified by distilling the free alcohol and water and catalyst and finally distilling of the ester. These distillations are preferably carried out under vacuum.

While I have disclosed the use of hydrochloric acid as the preferable esterification catalyst, the use of other strong acids such as hydrobromic, sulfuric, phosphoric and various sulfonic acids would be to a greater or less degree effective. However, hydrochloric acid is preferred because of its effectiveness, cheapness and convenience of removal from the reaction products.

These arsenical derivatives are extremely toxic materials and are advantageously employed as insecticides and wood preservatives to exterminate and prevent termite infestations in wood structures, to prevent rot, fungus growth, etc. Their use in connection with petroleum products has been disclosed in my co-pending applications; Serial Numbers 604,871 and 604,872, filed April 12, 1932. While substantially all of the aforesaid arsenite esters are soluble in both straight run petroleum fractions such as naphtha, kerosene, etc., and highly aromatic fractions such as Edeleanu extract, i. e. the petroleum fractions soluble in liquid sulfur dioxide, some are readily soluble only in the latter fractions but may be made soluble in straight run fractions by the addition of a common blending agent such as absolute ethyl alcohol. In general, the compounds soluble in straight run fractions are also soluble in Edeleanu extract. However, the reverse is not true. Thus, the arsenites of all the monohydroxy alcohols, such as ethyl, amyl and octyl alcohols are soluble in both straight run fractions and Edeleanu extract, i. e. liquid SO₂ extracts from petroleum fractions such as gasoline and kerosene. Likewise, the arsenites of some of the higher alcohols are also soluble in both types of fractions. Such compounds are the arsenites of "cellosolve", butyl "cellosolve" and butyl "carbitol". However, the arsenites of methyl "cellosolve", methyl "carbitol" and "carbitol" were found to be substantially insoluble in the straight run fractions but were soluble in the aromatic naphtha or Edeleanu extract.

All of the esters of arsenious acid are unstable in water. These will readily hydrolyze to precipitate arsenic trioxide. This tendency towards hydrolysis presents the favorable aspect that when the esters have been distributed through the wood structure, any contact with water will effect a deposit of insoluble arsenic trioxide which will remain distributed in the wood and thus give permanent protection against termite attack. However, in cases where the wood contains considerable moisture, penetration of the arsenical preparation would be difficult since precipitation will occur prior to any appreciable penetration in the wood. Therefore, it is necessary to thoroughly kiln-dry the wood prior to the application unless the wood is of exceptionally open character.

In some cases, the wood may be first forced under a cylinder equipped with small spikes which prick small holes at intervals in the surface. These holes would serve to lead the arsenical preparation into the wood from which points flow would take place with the grain of the wood. Such pricking operation would have very little deleterious effect on the structural strength but might permit the satisfactory application of the material by spraying, brushing or dipping.

The above disclosure is to be taken merely as illustrative of a preferred embodiment of my invention and is not to be considered limiting, since many variations may be made within the scope of the following claims.

I claim:
1. A method of producing arsenic esters which comprises heating arsenious oxide and a polyglycol.
2. A method of producing arsenic esters which comprises heating arsenious oxide and a polyglycol in the presence of an esterification catalyst.
3. A method of producing arsenic esters which comprises heating arsenious oxide and a mono-ether of ethylene glycol in the presence of an esterification catalyst.
4. A method of producing arsenic esters which comprises heating arsenious oxide and beta hydroxy ethyl beta' ethoxy ethyl ether.
5. A method of producing arsenic esters which comprises heating arsenious oxide and beta hydroxy ethyl beta' ethoxy ethyl ether in the presence of an inorganic acid esterification catalyst.

6. A method of producing arsenic esters which comprises heating arsenious oxide and beta ethoxy ethanol in the presence of an esterification catalyst.

7. A method of producing arsenic esters which comprises mixing an aliphatic alcohol and arsenious oxide, saturating the mixture with dry hydrogen chloride heating said mixture adding fresh amounts of alcohol to replace the alcohol vaporized as a result of said heating and recovering a substantially pure arsenite ester as a distillation residue.

8. A method of producing arsenic esters which comprises mixing a polyglycol and arsenious oxide, and adding a small amount of water before the esterification reaction has commenced and heating the mixture to esterify the aforesaid alcohol.

9. A method of producing arsenic esters which comprises mixing a mono-ether of di-ethylene glycol, arsenious oxide and water and heating the mixture.

10. A method of producing arsenic esters of polyglycols which comprises heating a mixture of arsenious oxide and a polyglycol to partially esterify said polyglycol and increasing the temperature to distill off the unconsumed polyglycol.

11. A method of producing arsenic esters of aliphatic dihydric alcohols which comprises heating arsenious oxide with a glycol-mono-alkyl ether.

12. A method of producing arsenic esters of aliphatic dihydric alcohols which comprises heating arsenious oxide with a glycol-mono-alkyl ether in the presence of an inorganic acid esterification catalyst.

13. A method of producing arsenic esters which comprises heating arsenious oxide with a mono-alkyl ether of ethylene glycol.

14. A method of producing arsenic esters which comprises heating arsenious oxide with a mono-alkyl ether of ethylene glycol in the presence of an esterification catalyst.

15. A method of producing arsenic esters which comprises heating arsenious oxide with a mono-alkyl ether of di-ethylene glycol.

16. A method of producing arsenic esters which comprises heating arsenious oxide with a mono-alkyl ether of di-ethylene glycol in the presence of an inorganic acid esterification catalyst.

17. A method for producing arsenic esters which comprises mixing arsenious oxide and an alcohol having a boiling point in excess of that of water, adding a small amount of water to lessen the vigor of the esterification reaction and heating the mixture to distill off the water.

18. A method for producing arsenic esters which comprises mixing arsenious oxide and an alcohol having a boiling point in excess of that of water, adding a small amount of water to lessen the vigor of esterification reaction, heating the mixture to distill off the water and then increasing the temperature to distill off any unconsumed alcohol.

19. An arsenite ester of beta ethoxy ethanol.

20. An arsenite ester of beta hydroxy ethyl beta' ethoxy ethyl ether.

21. A polyglycol ester of an arsenious acid.

22. A polyglycol ester of pyroarsenious acid.

23. A polyglycol ester of meta-arsenious acid.

24. An ethylene glycol mono-alkyl ether ester of pyro-arsenious acid.

25. A di-ethylene glycol mono-alkyl ether ester of meta-arsenious acid.

DAVID R. MERRILL.